United States Patent
Endo (10) Patent No.: US 11,254,602 B2
(45) Date of Patent: Feb. 22, 2022

(54) OPTICAL GLASS, OPTICAL ELEMENT, OPTICAL INSTRUMENT, AND METHOD FOR MANUFACTURING OPTICAL GLASS

(71) Applicant: CANON KABUSHIKI KAISHA, Tokyo (JP)

(72) Inventor: Michio Endo, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 317 days.

(21) Appl. No.: 16/167,227

(22) Filed: Oct. 22, 2018

(65) Prior Publication Data

US 2019/0119147 A1    Apr. 25, 2019

(30) Foreign Application Priority Data

Oct. 25, 2017   (JP) .............................. JP2017-206269

(51) Int. Cl.
| | |
|---|---|
| *C03C 3/12* | (2006.01) |
| *C03B 11/12* | (2006.01) |
| *C03B 19/10* | (2006.01) |
| *G02B 1/00* | (2006.01) |
| *C03C 3/155* | (2006.01) |

(52) U.S. Cl.
CPC .............. *C03C 3/12* (2013.01); *C03B 11/122* (2013.01); *C03B 19/102* (2013.01); *C03C 3/127* (2013.01); *G02B 1/00* (2013.01); *C03B 2215/12* (2013.01); *C03B 2215/17* (2013.01); *C03B 2215/24* (2013.01); *C03B 2215/48* (2013.01); *C03C 3/155* (2013.01); *C03C 2203/10* (2013.01); *C03C 2203/40* (2013.01)

(58) Field of Classification Search
CPC ......... C03C 3/062; C03C 3/068; C03C 3/127; C03C 3/15; C03C 3/155; C03C 2203/10; C03C 2203/40; C03C 12/00; C03B 11/122; C03B 19/102; C03B 2215/12; C03B 2215/17; C03B 2215/24; C03B 2215/48; G02B 1/00
See application file for complete search history.

(56) References Cited

U.S. PATENT DOCUMENTS

| | | | |
|---|---|---|---|
| 2011/0065564 A1* | 3/2011 | Fu ........................... | C03C 3/155 501/42 |
| 2011/0105294 A1* | 5/2011 | Negishi .................. | C03C 3/155 501/42 |
| 2011/0263410 A1* | 10/2011 | Negishi .................. | C03C 3/155 501/78 |
| 2019/0185369 A1* | 6/2019 | Inoue .................. | C03B 19/1005 |

FOREIGN PATENT DOCUMENTS

| | | | | |
|---|---|---|---|---|
| CN | 101516795 A | 8/2009 | | |
| CN | 102219373 A | 10/2011 | | |
| CN | 102249538 A | 11/2011 | | |
| CN | 102272064 A | 12/2011 | | |
| CN | 103351101 A | 10/2013 | | |
| CN | 104788018 A | 7/2015 | | |
| CN | 104860531 A | 8/2015 | | |
| CN | 104944767 A | 9/2015 | | |
| JP | 2006-182577 A | 7/2006 | | |
| JP | 2006182577 A | * | 7/2006 | ............... C03C 3/19 |
| JP | 2007-022846 A | 2/2007 | | |
| JP | 2011-093781 A | 5/2011 | | |
| JP | 2014047099 A | * | 3/2014 | ............. C03C 3/155 |
| JP | 2014-196236 A | 10/2014 | | |
| JP | 2016-147775 A | 8/2016 | | |
| WO | WO-2018037797 A1 | * | 3/2018 | ........... C03C 4/0085 |

OTHER PUBLICATIONS

Guo, Zhong, et al. "Rare Earth Science and Technology", The Chinese Society of Rare Earths, ISBN 978-750467096-0, 2014-2015.

* cited by examiner

*Primary Examiner* — Elizabeth A. Bolden
(74) *Attorney, Agent, or Firm* — Canon U.S.A., Inc., IP Division (57) ABSTRACT

An optical glass includes $La^{3+}$, $Zn^{2+}$, $Nb^{5+}$, and $Ti^{4+}$ as a cation configuring glass. $La^{3+}$, $Zn^{2+}$, $Nb^{5+}$, and $Ti^{4+}$ which satisfy 10 cat %≤$La^{3+}$≤20 cat %, 10 cat %≤$Zn^{2+}$≤60 cat %, 20 cat %≤$Nb^{5+}$≤60 cat %, and 0 cat %≤$Ti^{4+}$≤40 cat % expressed by cation %.

12 Claims, 6 Drawing Sheets

OPTICAL GLASS, OPTICAL ELEMENT, OPTICAL INSTRUMENT, AND METHOD FOR MANUFACTURING OPTICAL GLASS

BACKGROUND

Field

The present disclosure relates to an optical glass containing rare earths, such as $La_2O_3$, $Nb_2O_5$, and ZnO as essential components, an optical element, such as lens, obtained by molding the optical glass, an optical instrument, and a method for manufacturing an optical glass.

Description of the Related Art

In general, an optical glass contains network former oxides typified by $SiO_2$, $B_2O_3$, $P_2O$, and the like and network modifier oxides or intermediate oxides, such as $Nb_2O_5$ and $TiO_2$, which give a high refractive index and high dispersion.

$Nb_2O$ and $TiO_2$ have absorption edges to the vicinity of visible light, and therefore a glass containing $Nb_2O_5$ and $TiO_2$ in a high proportion has a high refractive index and high dispersion. In order to obtain a high refractive index and high dispersion glass, network former oxides giving a low refractive index and low dispersion are replaced by $Nb_2O_5$ or $TiO_2$ to relatively increase the proportion of $Nb_2O_5$ or $TiO_2$ to thereby produce the high refractive index and high dispersion glass. $TiO_2$ has a dispersion effect higher than that of $Nb_2O_5$, and therefore there is a tendency to increase the replacement to $TiO_2$ than $Nb_2O_5$ in the case of a high dispersion glass.

When the proportion of the network former oxide is reduced and the proportion of the network modifier oxide or the intermediate oxide is increased in order to obtain the high refractive index and high dispersion glass, the glass becomes unstable and a crystal easily deposits. Moreover, when the content of $TiO_2$ increases, the glass transition point (Tg) increases.

Japanese Patent Laid-Open No. 2007-022846 discloses a $B_2O_3$—$TiO_2$-based glass. Japanese Patent Laid-Open No. 2016-147775 discloses a $La_2O_3$—$TiO_2$—$Nb_2O_5$-based glass.

Japanese Patent Laid-Open No. 2007-022846 discloses a glass containing $B_2O_3$ as an essential component, at least one kind of oxide selected from $La_2O_3$, $Gd_2O_3$, $Y_2O_3$, $Yb_2O_3$, $TiO_2$, $Nb_2O_5$, and $WO_3$, and at least one kind of oxide selected from MgO, CaO, and the like. Such a glass contains $B_2O_3$ which is a low refractive index and low dispersion component as an essential component, and therefore a high dispersion glass is difficult to obtain. When a refractive index and high dispersion glass is obtained by increasing the proportion of $TiO_2$, there has been a problem that the glass transition point (Tg) increases.

The glass disclosed in Japanese Patent Laid-Open No. 2016-147775 is an $La_2O_3$—$TiO_2$—$Nb_2O_5$ glass free from typical network former components unlike a conventional glass and has a high refractive index and high dispersion. However, the glass transition point (Tg) is high, and thus there has been a problem that the molding temperature needs to be a high temperature in a glass molded lens obtained by softening a glass using a die to form the glass into a lens.

SUMMARY

The present disclosure provides an optical glass having a high refractive index and a low glass transition point.

An optical glass contains $La^{3+}$, $Zn^{2+}$, $Nb^{5+}$, and $Ti^{4+}$ as a cation configuring glass, in which $La^{3+}$, $Zn^{2+}$, $Nb^{5+}$, and $Ti^{4+}$ satisfy 10 cat %$\leq La^{3+}\leq$20 cat %, 10 cat %$\leq Zn^{2+}\leq$60 cat %, 20 cat %$\leq Nb^{5+}\leq$60 cat %, and 0 cat %$\leq Ti^{4+}\leq$40 cat % expressed by cation %.

An optical element contains an optical glass containing $La^{3+}$, $Zn^{2+}$, $Nb^{5+}$, and $Ti^{4+}$ as a cation configuring glass, in which $La^{3+}$, $Zn^{2+}$, $Nb^{5+}$, and $Ti^{4+}$ satisfy 10 cat %$\leq La^{3+}\leq$20 cat %, 10 cat %$\leq Zn^{2+}\leq$60 cat %, 20 cat %$\leq Nb^{5+}\leq$60 cat %, and 0 cat %$\leq Ti^{4+}\leq$40 cat % expressed by cation %.

An optical instrument contains an optical element, in which the optical element is the optical element described above.

A method for manufacturing an optical glass using a containerless solidification method includes levitating a glass material satisfying 10 cat %$\leq La3+\leq$20 cat %, 10 cat %$\leq Zn2+\leq$60 cat %, 20 cat %$\leq Nb^{5+}\leq$60 cat %, and 0 cat %$\leq Ti4+\leq$40 cat % expressed by cation % by levitation gas, heating and melting the levitated glass material to obtain a melt, and cooling and solidifying the melt in a state where the melt is levitated.

Further features of the present disclosure will become apparent from the following description of exemplary embodiments with reference to the attached drawings.

DESCRIPTION OF THE EMBODIMENTS

Hereinafter, the present disclosure is described in detail.
Optical Glass

An optical glass of this embodiment is a glass in which the proportion of the total amount of rare earth ions ($La^{3+}$, $Gd^{3+}$, $Y^{3+}$, $Yb^{3+}$, $Lu^{3+}$), $Zn^{2+}$, and $Nb^{5+}$ contained as cations is high. The glass of the present disclosure is a glass having a high refractive index and high dispersion and having a low glass transition point.

The glass of this embodiment satisfies 10 cat %$\leq La^{3+}\leq$20 cat % in terms of a ratio (expressed by cation %) to the total cations contained in the glass as cations configuring the glass.

$La^{3+}$ is considered to act the same as network former components. When the content of rare earth ions is smaller than 10 cat %, a glass is hard to obtain. When the content is larger than 20 cat %, a high dispersion glass cannot be obtained. $La^{3+}$ can be replaced by at least one or more rare earth ions selected from $La^{3+}$, $Gd^{3+}$, $Y^{3+}$, $Yb^{3+}$, and $Lu^{3+}$. $La^{3+}$ can be replaced by $Y^{3+}$, $Yb^{3+}$, and $Lu^{3+}$ by 0 cat % or more and 10 cat % or less. $La^{3+}$ can be replaced by $Gd^{3+}$ by 0 cat % or more and 15 cat % or less.

The optical glass of this embodiment satisfies 10 cat %$\leq Zn^{2+}\leq$60 cat %. $Zn^{2+}$ is an essential component which has effects of extending the vitrification range and lowering the glass transition point and which suppresses a refractive index reduction. In a conventional grass production method including producing a melt using platinum and the like, pouring the melt into a die, and then cooling the melt to obtain a glass, the refractive index reduction is larger in $Zn^{2+}$ than in $La^{3+}$. On the other hand, according to a method of this application including holding a melt, and then cooling the melt to obtain a glass without using a container, the refractive index reduction is smaller in $Zn^{2+}$ than in $La^{3+}$. In order to realize a low glass transition point while maintaining a refractive index, the effect of $Zn^{2+}$ is high. When the content of $La^{3+}$ or $Zn^{2+}$ is less than 10 cat %, the effect of lowering the glass transition point decreases. Moreover, the proportion of $Nb^{5+}$ or $Ti^{4+}$ which is a reduction component relatively increases, and thus a reaction with a die is caused in the production of a glass molded lens, which is obtained by softening glass using a die to form the glass into a lens, to cause a defect. When the content is larger than 60 cat %, a glass becomes unstable and is easily crystallized (devitrification). Moreover, the viscosity in melting decreases, and thus a large glass body cannot be obtained. Moreover, when the content is larger than 60 cat %, the volatilization amount increases.

The optical glass of this embodiment satisfies 20 cat %≤$Nb^{5+}$≤60 cat %. In the glass, $Nb^{5+}$ partially acts as the glass network former component and particularly acts to give a high refractive index and high dispersion. When the content of $Nb^{5+}$ exceeds 60 cat %, the glass becomes unstable and is crystallized (devitrification).

The optical glass of this embodiment satisfies 0 cat %≤$Ti^{4+}$≤40 cat %. When the content of $Ti^{4+}$ is larger than 40 cat %, the glass transition point rises. Moreover, the glass is yellowish and λ5 becomes worse.

When an optical glass is produced at $Ti^{4+}$=0 cat %, 10 cat %≤$La^{3+}$≤20 cat %, 20 cat %≤$Zn^{2+}$≤60 cat %, and 30 cat %≤$Nb^{5+}$≤60 cat % may be satisfied. In the case of $Ti^{4+}$=0 cat %, vitrification is difficult to achieve in the case of less than 30 cat %.

The optical glass of this embodiment may satisfy 60 cat %≤(Total amount of $La^{3+}$, $Gd^{3+}$, $Y^{3+}$, $Yb^{3+}$, $Lu^{3+}$, $Zn^{2+}$, and $Nb^{5+}$)≤100 cat %. When the total ratio of the ions is less than 60 cat %, a high dispersion glass cannot be obtained.

In the optical glass of this embodiment, the refractive index at the d-line may be 2.20 or more and 2.28 or less and the Abbe number may be 19 or more and 22 or less.

In order to enable the production of an aspherical lens, the optical glass of this embodiment may have a glass transition point (Tg) of 705° C. or less. When the Tg is high, the temperature when the glass is pressed also rises, and therefore a reaction between the glass and a press die is accelerated, so that bubbles are likely to generate.

Optical Element

An optical element of this embodiment is obtained by molding the above-described optical glass. In this specification, the optical element refers to an element configuring optical instruments, such as a lens, a prism, a reflector (mirror), and a diffraction grating.

Method for Manufacturing Optical Glass

A method for manufacturing an optical glass of this embodiment is a containerless solidification method including irradiating a glass material with carbon dioxide laser for melting, levitating the melt by a gas fluid jetted from a nozzle, and then cooling and solidifying the same. As the gas type of the gas fluid, inert gas typified by air, nitrogen, oxygen, argon, and the like is usable according to the intended use. The gas flow rate can be set to 200 to 5000 ml/min in accordance with the levitation of the melt.

The containerless solidification method is a method including heating and melting materials, and then cooling and solidifying the resultant substance without using containers of Pt alloys (Pt or platinum alloy, for example, Pt—Au, Pt—Au—Rh, and the like), C-based substances (C, SiC, and the like), and the like.

The containerless solidification method has two major features. First, no container is used, and therefore the heterogeneous nucleation occurring in the interface between a melt and a container does not occur and a deep cooling degree can be obtained. Secondly, no container is used, and therefore a specimen having a high melting point equal to or higher than the melting point (for example, 1768° C. in the case of Pt) of a container itself can also be heated and melted.

Main processes in the containerless solidification method are a process of heating and melting a glass material, a process of levitating a melt obtained by heating and melting the glass material, and a process of cutting a heating source to cool and solidify the melt.

In the process of heating and melting the glass material, a laser heating source typified by carbon dioxide laser, a high frequency heating source, a microwave heating source, an image furnace by gathering light of a halogen lamp, and the like are usable as the heating source.

In the process of levitating the melt, magnetic levitation, electrostatic levitation, acoustic levitation, or gas jet levitation (gas levitation) or a combination thereof (for example, acoustic levitation and gas jet levitation, and the like), and a state under minute gravity (for example, falling, space, and the like) are usable. Among the above, the gas jet levitation (gas levitation) may be used because the levitation can be achieved by a simple apparatus configuration.

In the process of cooling and solidifying the melt in a state where the melt is levitated, a transparent glass bulb can be obtained by cooling and solidifying the melt at a cooling rate at which a crystal does not generate from the melt.

EXAMPLES

Hereinafter, the present disclosure is described with reference to Examples.

Completed glasses were measured by ICP (inductively coupled plasma) emission spectrometry.

In Examples 1 to 17, $La_2O_3$ ($LaF_3$, $La_2S_3$), ZnO ($ZnCO_3$), $Nb_2O_5$, $TiO_2$ ($TiS_2$), and ZnO as glass raw materials were weighed so that the total amount was 10 g in such a manner that the compositions of cations in the glasses are as illustrated in Table 1.

Thereafter, raw materials for glass synthesis were mixed using an agate mortar for 15 minutes to be uniform. In order to remove moisture in the mixture, the mixture was baked at 600° C. in an electric furnace for 7 hours. A baked powder was charged into a pressing rubber die, and then held at 20 kN for 1 minute by a cold isotropic pressing method. A completed rod-like powder (green compact) was baked at 1200° C. for 7 hours to obtain a glass material sintered compact 1. (However, when there is no necessity of particularly considering moisture in the mixture, a powder may be subjected to simple pressing to be formed into a green compact.). The sintered compact 1 was set on a nozzle 3 of a gas jet levitation device illustrated in FIG. 1, and then a carbon dioxide laser 5 was emitted thereto from above for heating while causing oxygen gas 4 of levitation gas to flow from a nozzle hole at 500 ml/min. Herein, the type of the oxygen gas 4 is not limited, e.g., dry air or nitrogen, insofar as a specimen 2 can be levitated. The gas amount can be adjusted as appropriate between 0.5 to 6 L/min in accordance with the size of the sintered compact 1. After confirming that the sintered compact 1 set on the nozzle 3 of the gas jet levitation device was heated to completely become a melt, and then the melt was levitated by the oxygen gas, the laser output was interrupted to rapidly cool the melt to obtain the specimen 2 which was transparent and had a spherical shape.

Figure 1:
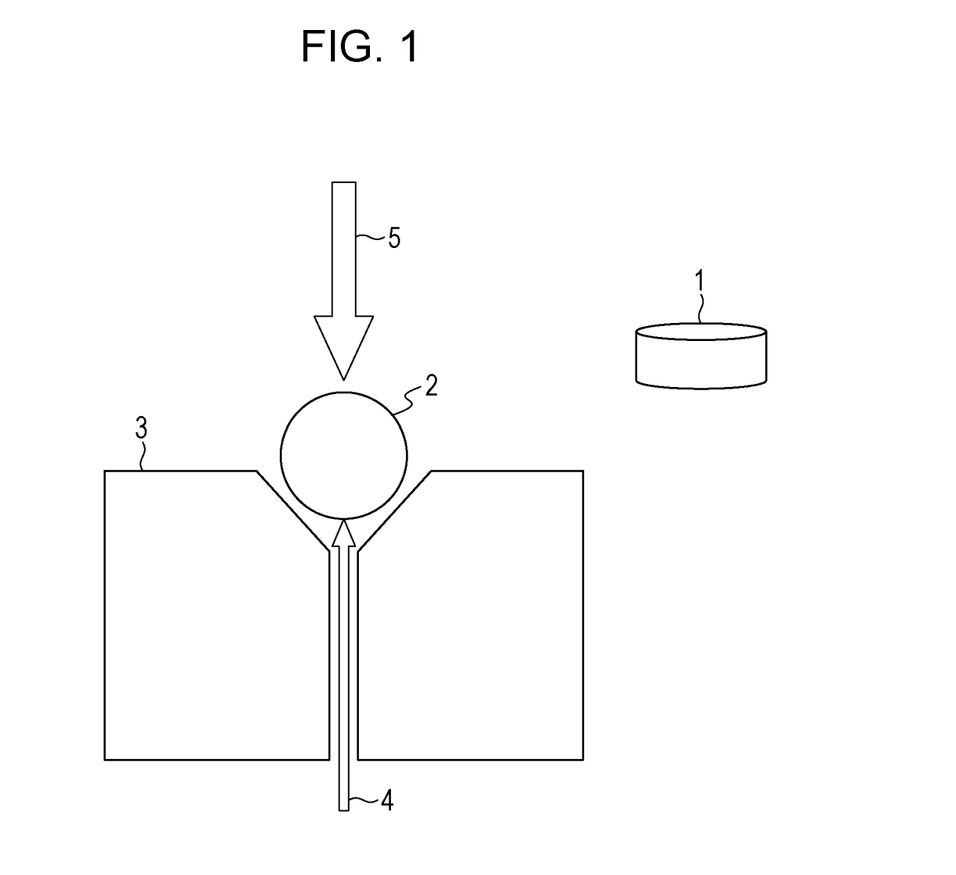
FIG. 1 is a conceptual diagram illustrating a gas jet levitation device.
Figure 2:
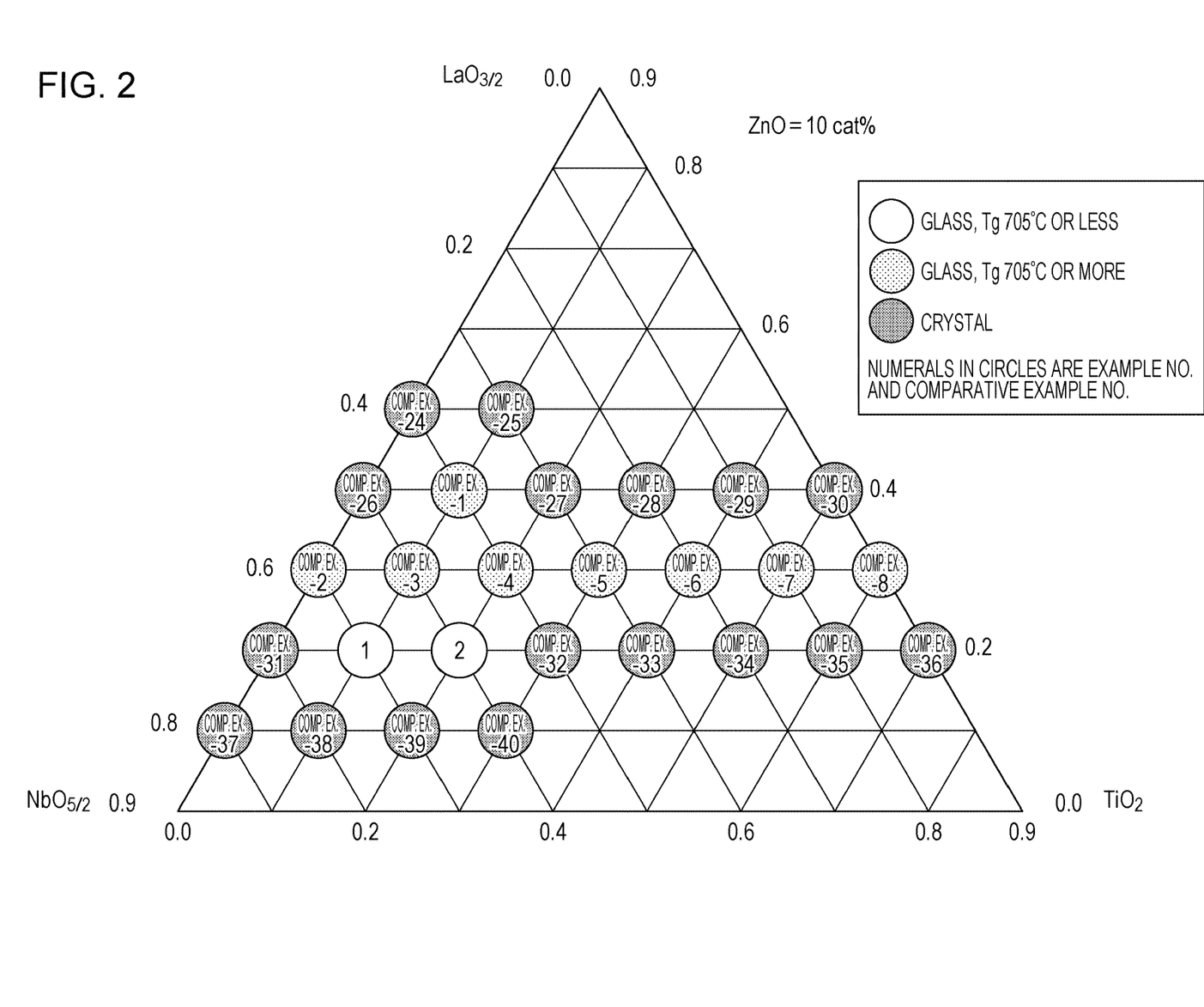
FIG. 2 is a triphase diagram of $LaO_{3/2}$—$NbO_{5/2}$—$TiO_2$ when ZnO is 10 cat %.
Figure 3:
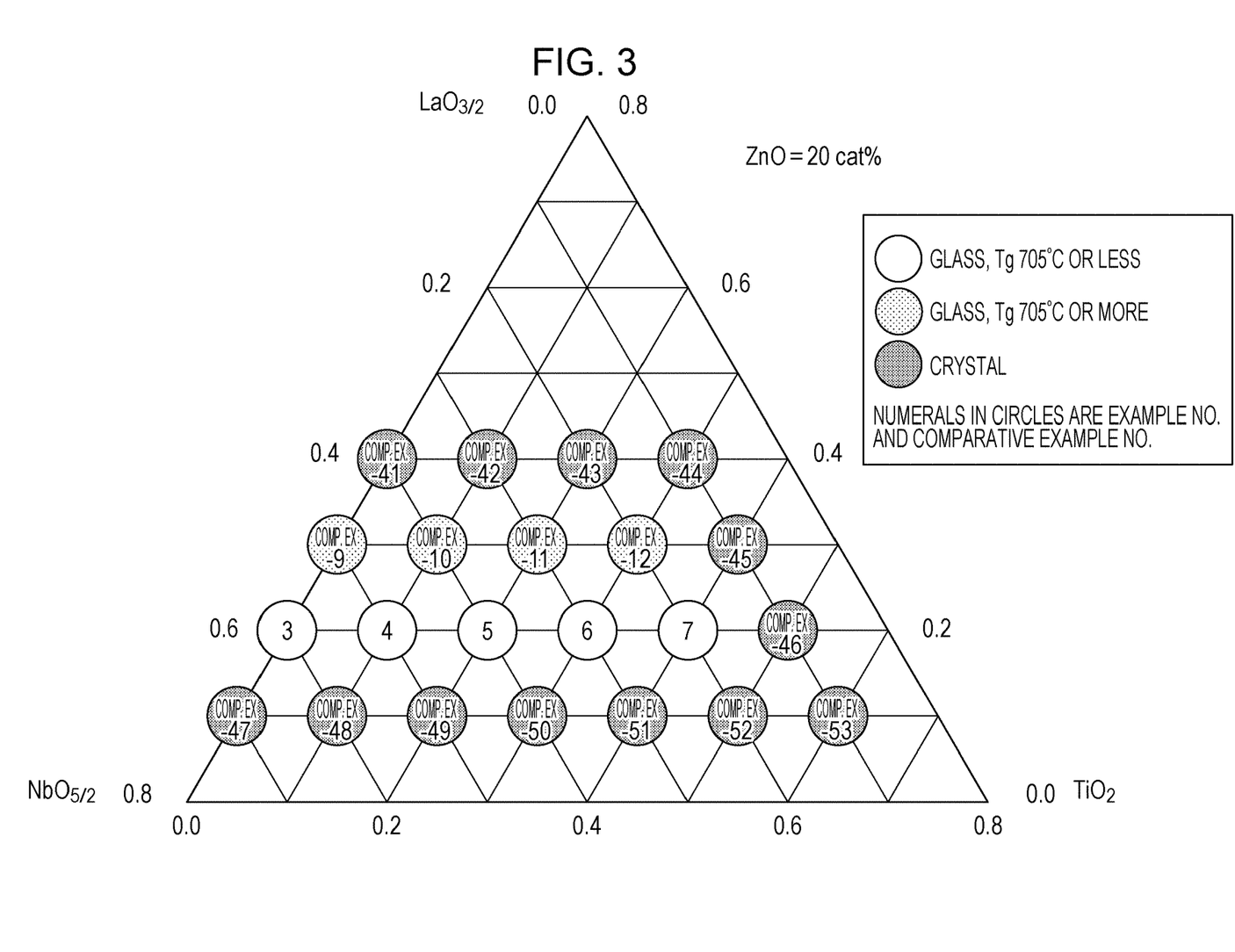
FIG. 3 is a triphase diagram of $LaO_{3/2}$—$NbO_{5/2}$—$TiO_2$ when ZnO is 20 cat %.
Figure 4:
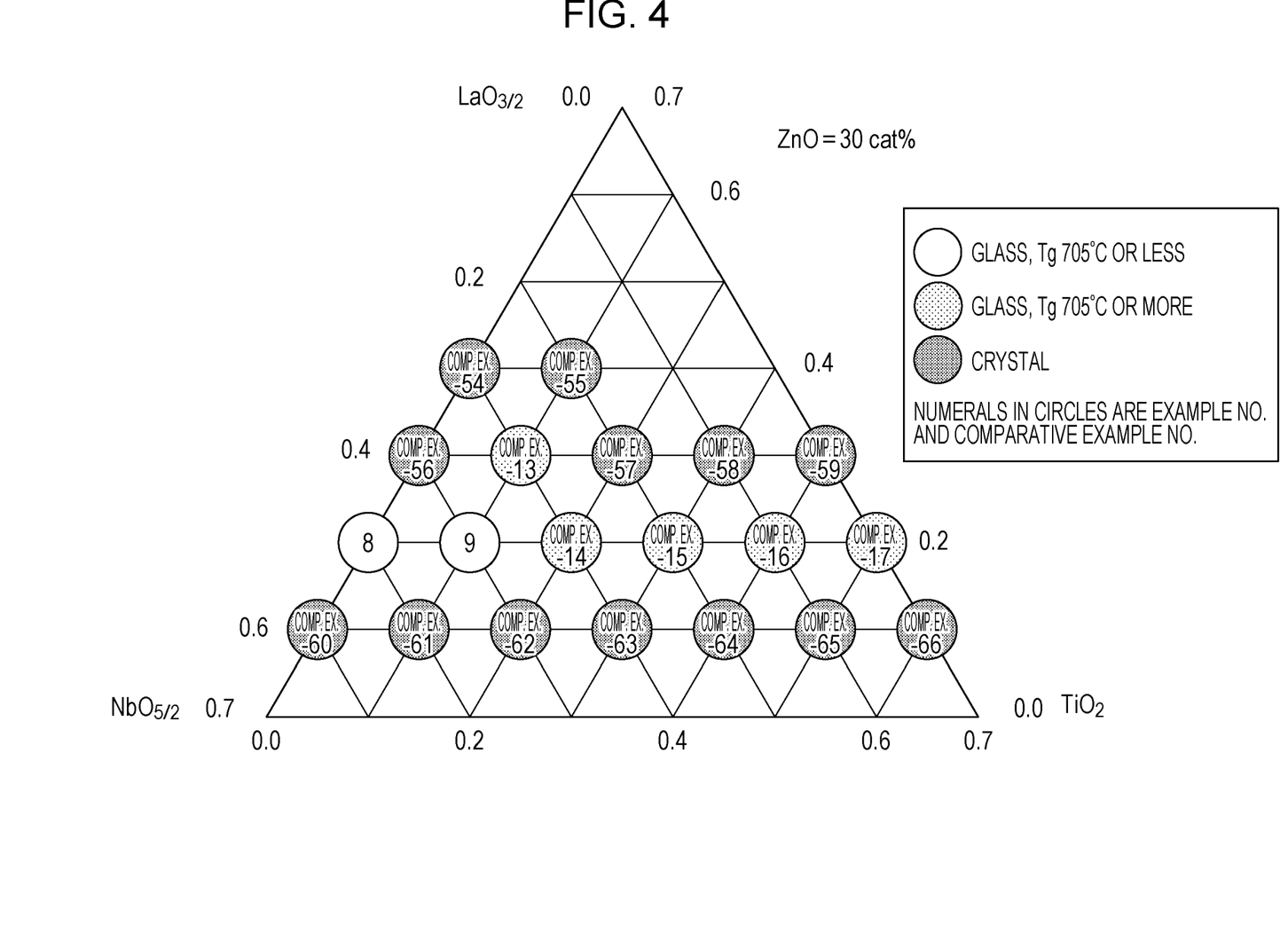
FIG. 4 is a triphase diagram of $LaO_{3/2}$—$NbO_{5/2}$—$TiO_2$ when ZnO is 30 cat %.
Figure 5:
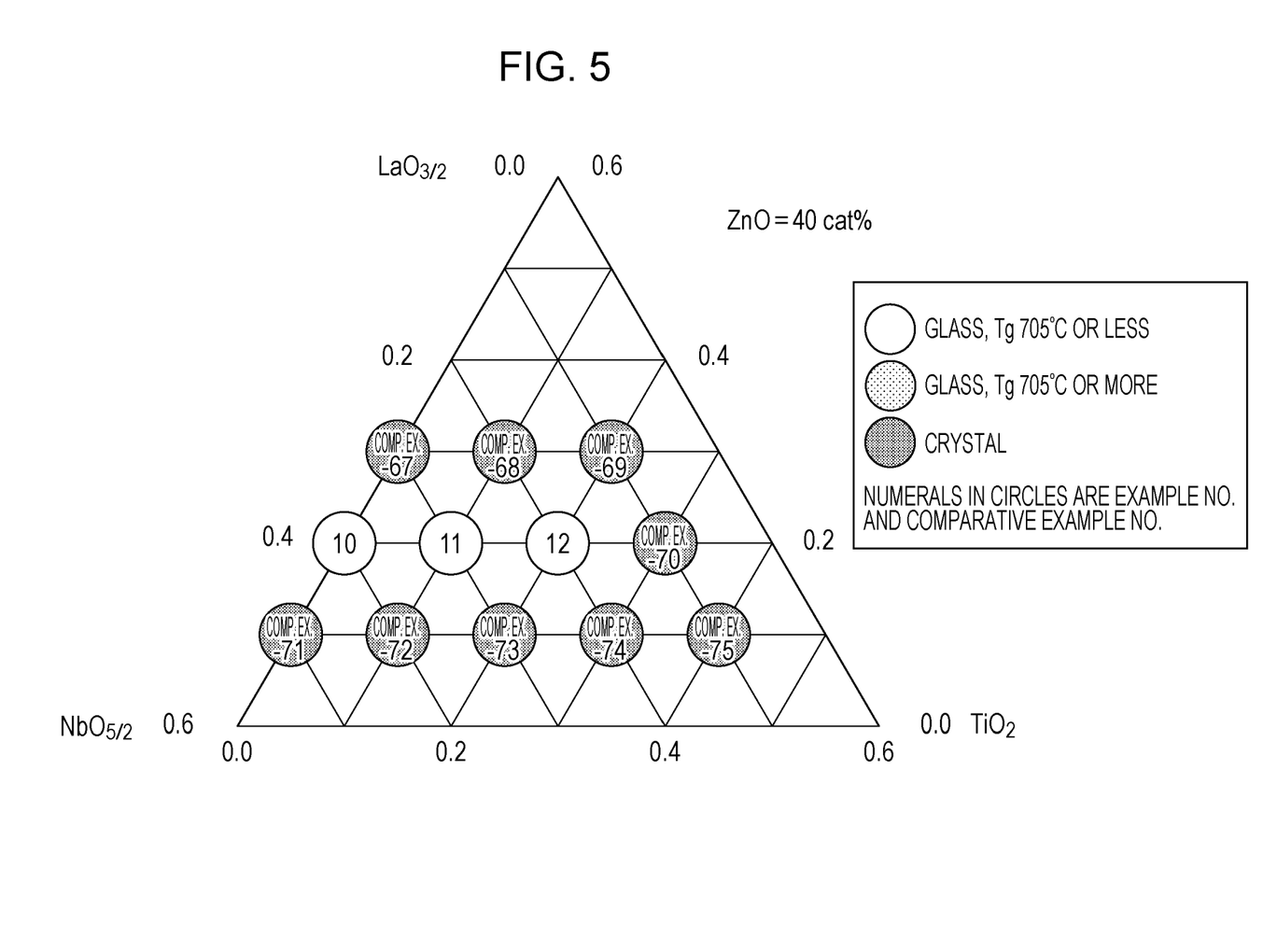
FIG. 5 is a triphase diagram of $LaO_{3/2}$—$NbO_{5/2}$—$TiO_2$ when ZnO is 40 cat %.
Figure 6:
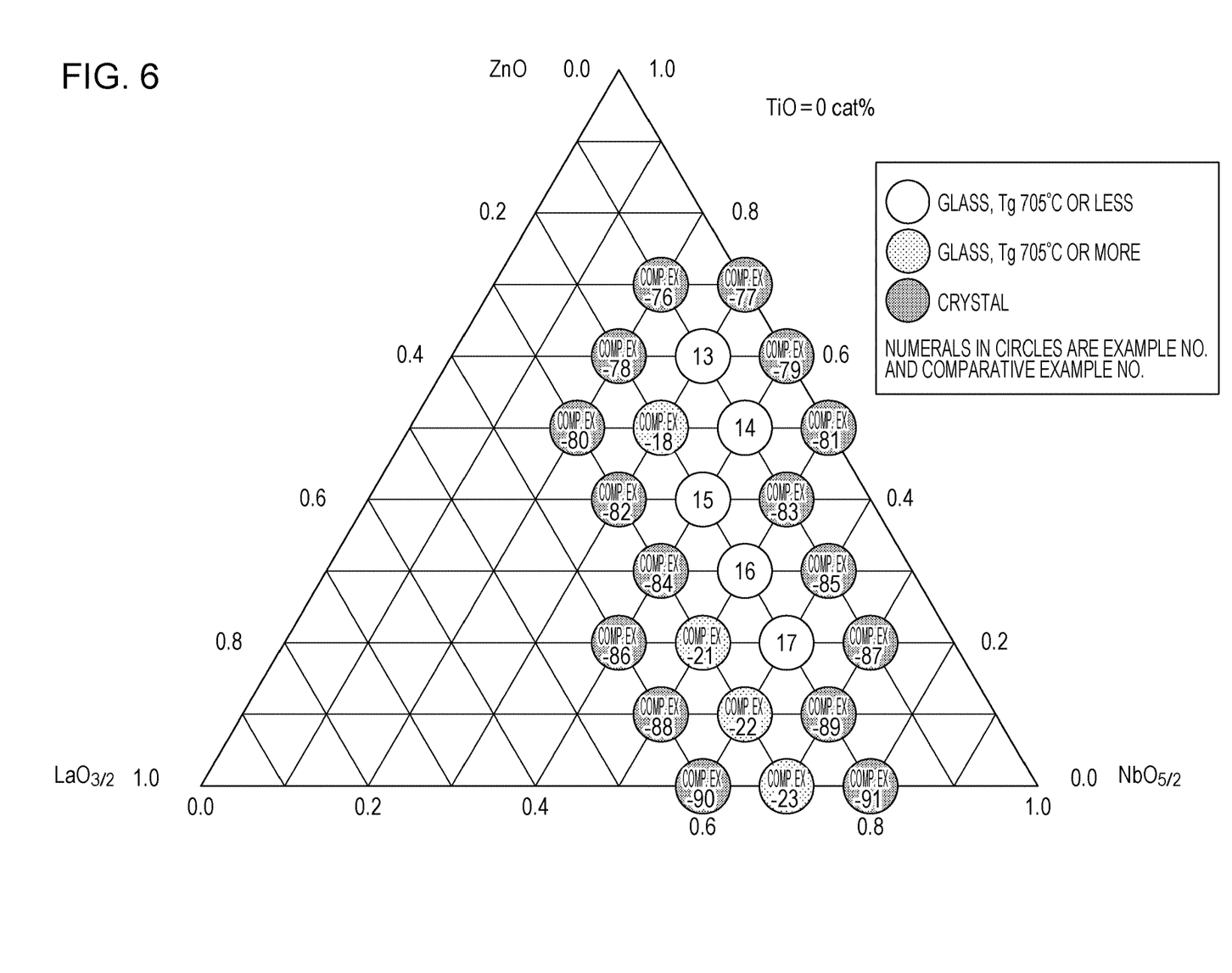
FIG. 6 is a triphase diagram of ZnO—$LaO_{3/2}$—$NbO_{5/2}$ when $TiO_2$ is 0 cat %.

The obtained spherical specimen 2 was introduced as a glass raw material into a molding dye containing an upper die, a lower die, and a barrel die coaxially storing them, and then continuous molding of an optical element was performed. The upper die is connected to a press shaft and can press-mold the glass raw material disposed on the lower die by the vertical movement of the press shaft. A heater is built in the barrel die, and thus the temperatures of the upper and lower dies can be controlled. As a die material, hard metal containing tungsten carbide as a main component was selected. The molding surface of the upper die was processed into a convex shape and the molding surface of the lower die was processed into a concave shape, whereby a convex meniscus-shaped optical element was molded. On the molding surfaces of the upper die and the lower die, a carbon film was formed. Herein, the film formed on the molding surface is not limited to the carbon film and noble metal-based films may be used. The molding die was heated by the heater in a state where the upper die was sufficiently raised by the movement of the press shaft, and then pressing was performed at temperatures of the upper and lower dies of Tg+50° C. or less to obtain a glass molded lens.

In Comparative Examples 1 to 91, $La_2O_3$ ($LaF_3$, $La_2S_3$), ZnO ($ZnCO_3$), $Nb_2O_5$, $TiO_2$ ($TiS_2$), and ZnO as glass raw materials were weighed so that the total amount was 10 g in such a manner that the compositions of cations in glasses are as illustrated in Tables 2, 3, and 4.

Evaluation Method
Determination of Vitrification

The spherical specimen 2 was then observed under an optical microscope (100 times) to determine the presence of a crystal. In Tables 1 and 2, "A" is given to those in which a crystal was not observed when the spherical specimen having a diameter of 3 mm was observed under the microscope in Table 1. "B" is given to those in which a crystal was observed.

Measurement of Glass Transition Point and ΔTx

The spherical specimen 2 was ground by an agate mortar, charged into a platinum pan having an outer diameter of 5 mm and a height of 2.5 mm, and then heated to 1200° C. at a temperature elevation rate of 10° C./min with a DSC8270 differential scanning calorimeter (DSC) manufactured by Rigaku Corporation. Then, the glass transition point (Tg) was detected. ΔTx (Tx−Tg=ΔTx) which is a difference between the crystallization start temperature Tx and the glass transition point Tg was determined.

Refractive Index Measurement

The refractive index and the Abbe number were measured using a KPR-2000 manufactured by Shimadzu Corporation by producing two surfaces orthogonal to each other by polishing. When the specimen was small, the transparent spherical specimen was polished into a hemispherical shape, and then the measurement with an ellipsometer (M-2000F manufactured by J.A. Woollam. Co., Inc.) was performed.

Evaluation Results

Table 1 shows the results of the transparent spherical specimens obtained in Examples 1 to 17. Tables 2, 3, and 4 show the results of Comparative Examples 1 to 91.

Glasses with the compositions in which the total rare earth ion was 10 cat % or more and 20 cat % or less, $Zn^{2+}$ was 10 cat % or more and 60 cat % or less, $Nb^{5+}$ was 20 cat % or more and 76 cat % or less, and $Ti^{4+}$ was 0 cat % or more and 40 cat % or less in Table 1 were produced. In the glasses of Examples 1 to 17, a crystal was not observed by the observation under the optical microscope, the glass transition point was confirmed in the measurement with the differential scanning calorimeter, and transparent spherical specimens were able to be obtained.

In the glasses of Examples 1 to 17, the refractive indices at the d-line (587.56 nm) were all 2.20 or more. The Abbe numbers (vd) were all 22 or less. The glass molded lenses after pressing were all free from appearance defects, such as breakage, chipping, and fogging.

In Table 2, the rare earth ion contents of Comparative Examples 1 to 13 and Comparative Examples 19 to 23 are larger than 20 cat %. Therefore, the glass transition point (Tg) was not observed or was higher than 705° C. Herein, it is considered that the glass transition point (Tg) was not observed because the exothermic peak starting from the crystallization start temperature and the glass transition point (Tg) overlapped with each other and cannot be separated from each other. In such a glass, a trouble arises that a crystal deposits in the glass mold production.

In Comparative Examples 14 to 16 and 18, the glass transition points (Tg) were higher than 710.4° C.

Comparative Example 17 does not contain $Nb^{5+}$ and has a total amount of $La^{3+}$, $Nb^{5+}$, and $Zn^{2+}$ smaller than 60 cat %, and therefore a glass having a diameter of 3 mm was not obtained.

In Tables 3 and 4, a φ3 glass was not obtained in Comparative Examples 24 to 91.

TABLE 1

| Examples | | $LaO_{1.5}$ | ZnO | $NbO_{2.5}$ | $TiO_2$ | total | La + Nb + Zn | Vitrifaction | Tg | Tx | ΔTx | nd | vd |
|---|---|---|---|---|---|---|---|---|---|---|---|---|---|
| Ex. 1 | cat % | 20 | 10 | 60 | 10 | 100 | 90 | A | 697.9 | 733.1 | 35.2 | | |
| Ex. 2 | cat % | 20 | 10 | 50 | 20 | 100 | 80 | A | 694.5 | 738.8 | 44.3 | 2.27009 | |
| Ex. 3 | cat % | 20 | 20 | 60 | 0 | 100 | 100 | A | 705 | 734.7 | 29.6 | 2.22919 | 20.36 |
| Ex. 4 | cat % | 20 | 20 | 50 | 10 | 100 | 90 | A | 662.4 | 710.5 | 48.1 | 2.22506 | 19.89 |
| Ex. 5 | cat % | 20 | 20 | 40 | 20 | 100 | 80 | A | 676.9 | 738.3 | 61.4 | 2.23709 | 19.26 |
| Ex. 6 | cat % | 20 | 20 | 30 | 30 | 100 | 70 | A | 662.8 | 700.8 | 38 | 2.27372 | |
| Ex. 7 | cat % | 20 | 20 | 20 | 40 | 100 | 60 | A | 691.6 | 725 | 33.4 | | |
| Ex. 8 | cat % | 20 | 30 | 50 | 0 | 100 | 100 | A | 646.5 | 720.4 | 73.9 | 2.21763 | 21.02 |
| Ex. 9 | cat % | 20 | 30 | 40 | 10 | 100 | 90 | A | 679.9 | 727.5 | 47.6 | 2.21246 | 20.88 |
| Ex. 10 | cat % | 20 | 40 | 40 | 0 | 100 | 100 | A | 665.1 | 713.4 | 48.3 | 2.20850 | 21.16 |
| Ex. 11 | cat % | 20 | 40 | 30 | 10 | 100 | 90 | A | 674.7 | 726.2 | 51.5 | | |
| Ex. 12 | cat % | 20 | 40 | 20 | 20 | 100 | 80 | A | 681.2 | 733 | 51.8 | | |
| Ex. 13 | cat % | 10 | 60 | 30 | 0 | 100 | 100 | A | 599.4 | 638 | 38.6 | | |
| Ex. 14 | cat % | 10 | 50 | 40 | 0 | 100 | 100 | A | 593.1 | 620.9 | 27.8 | | |
| Ex. 15 | cat % | 20 | 40 | 40 | 0 | 100 | 100 | A | 665 | 713.3 | 48.3 | | |

TABLE 1-continued

| Examples | | LaO$_{1.5}$ | ZnO | NbO$_{2.5}$ | TiO$_2$ | total | La + Nb + Zn | Vitrifaction | Tg | Tx | ΔTx | nd | νd |
|---|---|---|---|---|---|---|---|---|---|---|---|---|---|
| Ex. 16 | cat % | 20 | 30 | 50 | 0 | 100 | 100 | A | 647 | 720.9 | 73.9 | | |
| Ex. 17 | cat % | 20 | 20 | 60 | 0 | 100 | 100 | A | 705 | 734.6 | 29.6 | | |

TABLE 2

| Comparative Examples | | LaO$_{1.5}$ | ZnO | NbO$_{2.5}$ | TiO$_2$ | total | La + Nb + Zn | Vitrifaction | Tg | Tx | ΔTx | nd | νd |
|---|---|---|---|---|---|---|---|---|---|---|---|---|---|
| Comp. Ex. 1 | cat % | 40 | 10 | 40 | 10 | 100 | 90 | A | Undetectable | 796.6 | — | | |
| Comp. Ex. 2 | cat % | 30 | 10 | 60 | 0 | 100 | 100 | A | 738.5 | 772 | 33.5 | 2.22399 | 21.00 |
| Comp. Ex. 3 | cat % | 30 | 10 | 50 | 10 | 100 | 90 | A | 736.4 | 756.2 | 19.8 | | |
| Comp. Ex. 4 | cat % | 30 | 10 | 40 | 20 | 100 | 80 | A | 730.7 | 760.7 | 30 | 2.22691 | 20.27 |
| Comp. Ex. 5 | cat % | 30 | 10 | 30 | 30 | 100 | 70 | A | 733.9 | 762.9 | 29 | | |
| Comp. Ex. 6 | cat % | 30 | 10 | 20 | 40 | 100 | 60 | A | 764.2 | 795.7 | 31.5 | 2.25114 | 19.29 |
| Comp. Ex. 7 | cat % | 30 | 10 | 10 | 50 | 100 | 50 | A | 779.6 | 812.3 | 32.7 | | |
| Comp. Ex. 8 | cat % | 30 | 10 | 0 | 60 | 100 | 40 | 2φA 3φB | 816.9 | 838.3 | 21.4 | | |
| Comp. Ex. 9 | cat % | 30 | 20 | 50 | 0 | 100 | 100 | A | 755.3 | 765.7 | 10.4 | 2.22021 | 22.02 |
| Comp. Ex. 10 | cat % | 30 | 20 | 40 | 10 | 100 | 90 | A | 749.6 | 769.2 | 19.6 | | |
| Comp. Ex. 11 | cat % | 30 | 20 | 30 | 20 | 100 | 80 | A | 755 | 787.1 | 32.1 | 2.22899 | 20.53 |
| Comp. Ex. 12 | cat % | 30 | 20 | 20 | 30 | 100 | 70 | A | 725.2 | 768.7 | 43.5 | | |
| Comp. Ex. 13 | cat % | 30 | 30 | 30 | 10 | 100 | 90 | A | Undetectable | 793.4 | — | | |
| Comp. Ex. 14 | cat % | 20 | 30 | 30 | 20 | 100 | 80 | A | 722.7 | 755.5 | 32.8 | | |
| Comp. Ex. 15 | cat % | 20 | 30 | 20 | 30 | 100 | 70 | A | 710.4 | 747.1 | 36.7 | | |
| Comp. Ex. 16 | cat % | 20 | 30 | 10 | 40 | 100 | 60 | A | 731.2 | 775.1 | 43.9 | | |
| Comp. Ex. 17 | cat % | 20 | 30 | 0 | 50 | 100 | 50 | 2φA 3φB | 738.9 | 757.2 | 18.3 | | |
| Comp. Ex. 18 | cat % | 20 | 50 | 30 | 0 | 100 | 100 | A | Undetectable | 710.2 | — | | |
| Comp. Ex. 19 | cat % | 30 | 0 | 30 | 40 | 100 | 60 | A | 732 | 763.2 | 31.2 | | |
| Comp. Ex. 20 | cat % | 30 | 0 | 10 | 60 | 100 | 40 | A | 768 | 794.1 | 26.1 | | |
| Comp. Ex. 21 | cat % | 30 | 20 | 50 | 0 | 100 | 100 | A | 755 | 765.4 | 10.4 | | |
| Comp. Ex. 22 | cat % | 30 | 10 | 60 | 0 | 100 | 100 | A | 739 | 772.5 | 33.5 | | |
| Comp. Ex. 23 | cat % | 30 | 0 | 70 | 0 | 100 | 100 | A | 725 | 751.6 | 26.6 | | |

TABLE 3

| Comparative Examples | | LaO$_{1.5}$ | ZnO | NbO$_{2.5}$ | TiO$_2$ | total | La + Nb + Zn | Vitrifaction | Tg | Tx | ΔTx | nd | νd |
|---|---|---|---|---|---|---|---|---|---|---|---|---|---|
| Comp. Ex. 24 | cat % | 50 | 10 | 40 | 0 | 100 | 100 | B | — | — | — | — | — |
| Comp. Ex. 25 | cat % | 50 | 10 | 30 | 10 | 100 | 90 | B | — | — | — | — | — |
| Comp. Ex. 26 | cat % | 40 | 10 | 50 | 0 | 100 | 100 | B | — | — | — | — | — |
| Comp. Ex. 27 | cat % | 40 | 10 | 30 | 20 | 100 | 80 | B | — | — | — | — | — |
| Comp. Ex. 28 | cat % | 40 | 10 | 20 | 30 | 100 | 70 | B | — | — | — | — | — |
| Comp. Ex. 29 | cat % | 40 | 10 | 10 | 40 | 100 | 60 | B | — | — | — | — | — |
| Comp. Ex. 30 | cat % | 40 | 10 | 0 | 50 | 100 | 50 | B | — | — | — | — | — |
| Comp. Ex. 31 | cat % | 20 | 10 | 70 | 0 | 100 | 100 | B | — | — | — | — | — |
| Comp. Ex. 32 | cat % | 20 | 10 | 40 | 30 | 100 | 70 | 2φ fogging | — | — | — | — | — |
| Comp. Ex. 33 | cat % | 20 | 10 | 30 | 40 | 100 | 60 | B | — | — | — | — | — |
| Comp. Ex. 34 | cat % | 20 | 10 | 20 | 50 | 100 | 50 | B | — | — | — | — | — |
| Comp. Ex. 35 | cat % | 20 | 10 | 10 | 60 | 100 | 40 | B | — | — | — | — | — |
| Comp. Ex. 36 | cat % | 20 | 10 | 0 | 70 | 100 | 30 | B | — | — | — | — | — |
| Comp. Ex. 37 | cat % | 10 | 10 | 80 | 0 | 100 | 100 | B | — | — | — | — | — |
| Comp. Ex. 38 | cat % | 10 | 10 | 70 | 10 | 100 | 90 | B | — | — | — | — | — |
| Comp. Ex. 39 | cat % | 10 | 10 | 60 | 20 | 100 | 80 | B | — | — | — | — | — |
| Comp. Ex. 40 | cat % | 10 | 10 | 50 | 30 | 100 | 70 | B | — | — | — | — | — |
| Comp. Ex. 41 | cat % | 40 | 20 | 40 | 0 | 100 | 100 | B | — | — | — | — | — |
| Comp. Ex. 42 | cat % | 40 | 20 | 30 | 10 | 100 | 90 | B | — | — | — | — | — |
| Comp. Ex. 43 | cat % | 40 | 20 | 20 | 20 | 100 | 80 | B | — | — | — | — | — |
| Comp. Ex. 44 | cat % | 40 | 20 | 10 | 30 | 100 | 70 | B | — | — | — | — | — |
| Comp. Ex. 45 | cat % | 30 | 20 | 10 | 40 | 100 | 60 | B | — | — | — | — | — |
| Comp. Ex. 46 | cat % | 20 | 20 | 10 | 50 | 100 | 50 | B (fogging) | — | — | — | — | — |
| Comp. Ex. 47 | cat % | 10 | 20 | 70 | 0 | 100 | 100 | B | — | — | — | — | — |
| Comp. Ex. 48 | cat % | 10 | 20 | 60 | 10 | 100 | 90 | B | — | — | — | — | — |
| Comp. Ex. 49 | cat % | 10 | 20 | 50 | 20 | 100 | 80 | B | — | — | — | — | — |
| Comp. Ex. 50 | cat % | 10 | 20 | 40 | 30 | 100 | 70 | B | — | — | — | — | — |
| Comp. Ex. 51 | cat % | 10 | 20 | 30 | 40 | 100 | 60 | B | — | — | — | — | — |
| Comp. Ex. 52 | cat % | 10 | 20 | 20 | 50 | 100 | 50 | B | — | — | — | — | — |
| Comp. Ex. 53 | cat % | 10 | 20 | 10 | 60 | 100 | 40 | B | — | — | — | — | — |

TABLE 3-continued

| Comparative Examples | | $LaO_{1.5}$ | ZnO | $NbO_{2.5}$ | $TiO_2$ | total | La + Nb + Zn | Vitrifaction | Tg | Tx | ΔTx | nd | νd |
|---|---|---|---|---|---|---|---|---|---|---|---|---|---|
| Comp. Ex. 54 | cat % | 40 | 30 | 30 | 0 | 100 | 100 | B | — | — | — | — | — |
| Comp. Ex. 55 | cat % | 40 | 30 | 20 | 10 | 100 | 90 | B | — | — | — | — | — |
| Comp. Ex. 56 | cat % | 30 | 30 | 40 | 0 | 100 | 100 | B | — | — | — | — | — |
| Comp. Ex. 57 | cat % | 30 | 30 | 20 | 20 | 100 | 80 | B | — | — | — | — | — |
| Comp. Ex. 58 | cat % | 30 | 30 | 10 | 30 | 100 | 70 | B | — | — | — | — | — |

TABLE 4

| Comparative Examples | | $LaO_{1.5}$ | ZnO | $NbO_{2.5}$ | $TiO_2$ | total | La + Nb + Zn | Vitrifaction | Tg | Tx | ΔTx | nd | νd |
|---|---|---|---|---|---|---|---|---|---|---|---|---|---|
| Comp. Ex. 59 | cat % | 30 | 30 | 0 | 40 | 100 | 60 | B | — | — | — | — | — |
| Comp. Ex. 60 | cat % | 10 | 30 | 60 | 0 | 100 | 100 | B | — | — | — | — | — |
| Comp. Ex. 61 | cat % | 10 | 30 | 50 | 10 | 100 | 90 | B | — | — | — | — | — |
| Comp. Ex. 62 | cat % | 10 | 30 | 40 | 20 | 100 | 80 | B | — | — | — | — | — |
| Comp. Ex. 63 | cat % | 10 | 30 | 30 | 30 | 100 | 70 | B | — | — | — | — | — |
| Comp. Ex. 64 | cat % | 10 | 30 | 20 | 40 | 100 | 60 | B | — | — | — | — | — |
| Comp. Ex. 65 | cat % | 10 | 30 | 10 | 50 | 100 | 50 | B | — | — | — | — | — |
| Comp. Ex. 66 | cat % | 10 | 30 | 0 | 60 | 100 | 40 | B | — | — | — | — | — |
| Comp. Ex. 67 | cat % | 30 | 40 | 30 | 0 | 100 | 100 | B | — | — | — | — | — |
| Comp. Ex. 68 | cat % | 30 | 40 | 20 | 10 | 100 | 90 | B | — | — | — | — | — |
| Comp. Ex. 69 | cat % | 30 | 40 | 10 | 20 | 100 | 80 | B | — | — | — | — | — |
| Comp. Ex. 70 | cat % | 20 | 40 | 10 | 30 | 100 | 70 | X Surface fogging | — | — | — | — | — |
| Comp. Ex. 71 | cat % | 10 | 40 | 50 | 0 | 100 | 100 | B | — | — | — | — | — |
| Comp. Ex. 72 | cat % | 10 | 40 | 40 | 10 | 100 | 90 | B Devitrification during cooling | — | — | — | — | — |
| Comp. Ex. 73 | cat % | 10 | 40 | 30 | 20 | 100 | 80 | B Devitrification during cooling | — | — | — | — | — |
| Comp. Ex. 74 | cat % | 10 | 40 | 20 | 30 | 100 | 70 | B | — | — | — | — | — |
| Comp. Ex. 75 | cat % | 10 | 40 | 10 | 40 | 100 | 60 | B | — | — | — | — | — |
| Comp. Ex. 76 | cat % | 10 | 70 | 20 | 0 | 100 | 100 | B | — | — | — | — | — |
| Comp. Ex. 77 | cat % | 0 | 70 | 30 | 0 | 100 | 100 | B | — | — | — | — | — |
| Comp. Ex. 78 | cat % | 20 | 60 | 20 | 0 | 100 | 100 | B | — | — | — | — | — |
| Comp. Ex. 79 | cat % | 0 | 60 | 40 | 0 | 100 | 100 | B | — | — | — | — | — |
| Comp. Ex. 80 | cat % | 30 | 50 | 20 | 0 | 100 | 100 | B | — | — | — | — | — |
| Comp. Ex. 81 | cat % | 0 | 50 | 50 | 0 | 100 | 100 | B | — | — | — | — | — |
| Comp. Ex. 82 | cat % | 30 | 40 | 30 | 0 | 100 | 100 | B | — | — | — | — | — |
| Comp. Ex. 83 | cat % | 10 | 40 | 50 | 0 | 100 | 100 | B | — | — | — | — | — |
| Comp. Ex. 84 | cat % | 30 | 30 | 40 | 0 | 100 | 100 | B | — | — | — | — | — |
| Comp. Ex. 85 | cat % | 10 | 30 | 60 | 0 | 100 | 100 | B | — | — | — | — | — |
| Comp. Ex. 86 | cat % | 40 | 20 | 40 | 0 | 100 | 100 | B | — | — | — | — | — |
| Comp. Ex. 87 | cat % | 10 | 20 | 70 | 0 | 100 | 100 | B | — | — | — | — | — |
| Comp. Ex. 88 | cat % | 40 | 10 | 50 | 0 | 100 | 100 | B | — | — | — | — | — |
| Comp. Ex. 89 | cat % | 20 | 10 | 70 | 0 | 100 | 100 | B | — | — | — | — | — |
| Comp. Ex. 90 | cat % | 40 | 0 | 60 | 0 | 100 | 100 | B | — | — | — | — | — |
| Comp. Ex. 91 | cat % | 20 | 0 | 80 | 0 | 100 | 100 | B | — | — | — | — | — |

The optical glass of the present disclosure can be molded into an optical element. Moreover, the optical element can be used as optical pickup lenses of optical instruments, e.g., a camera, a digital camera, a VTR, a DVD, and the like.

The present disclosure can provide a glass having a high refractive index and high dispersion and having a low glass transition point.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-206269 filed Oct. 25, 2017 which is hereby incorporated by reference herein in its entirety.

What is claimed is:

1. An optical glass comprising:
$La^{3+}$, $Zn^{2+}$, and $Nb^{5+}$, and optionally $Ti^{4+}$, $Gd^{3+}$, $Y^{3+}$, $Yb^{3+}$, and/or $Lu^{3+}$, wherein expressed as cation %, $La^{3+}$, $Zn^{2+}$, $Nb^{5+}$, and $Ti^{4+}$ satisfy:
10 cat %≤$La^{3+}$≤20 cat %;
20 cat %<$Zn^{2+}$≤60 cat %;
20 cat %≤$Nb^{5+}$≤60 cat %; and
0 cat %≤$Ti^{4+}$≤40 cat %,
wherein $B_2O_3$ is not contained in the optical glass.

2. The optical glass according to claim 1, satisfying:
10 cat %≤$La^{3+}$≤20 cat %;
20 cat %<$Zn^{2+}$≤6.0 cat %;
30 cat %≤$Nb^{5+}$≤60 cat %; and
$Ti^{4+}$=0 cat %.

3. The optical glass according to claim 1, satisfying
60 cat % (Total amount of $La^{3+}$, $Gd^{3+}$, $Y^{3+}$, $Yb^{3+}$, $Lu^{3+}$, $Zn^{2+}$, and $Nb^{5±}$)≤100 cat %.

4. The optical glass according to claim 1, wherein
a refractive index at a d-line is 2.20 or more and 2.28 or less, and
an Abbe number is 19 or more and 22 or less.

5. The optical glass according to claim 1, wherein
a glass transition point (Tg) is 705° C. or less.

6. An optical element comprising:
an optical glass comprising:
  $La^{3+}$, $Zn^{2+}$, and $Nb^{5+}$, and optionally $Ti^{4+}$, $Gd^{3+}$, $Y^{3+}$, $Yb^{3+}$, and/or $Lu^{3+}$, wherein expressed as cation %, $La^{3+}$, $Zn^{2+}$, $Nb^{5+}$, and $Ti^{4+}$ satisfy:
    10 cat %≤$La^{3+}$≤20 cat %;
    20 cat %<$Zn^{2+}$≤60 cat %;
    20 cat %≤$Nb^{5+}$≤60 cat %; and
    0 cat %≤$Ti^{4+}$≤40 cat %,
  wherein $B_2O_3$ is not contained in the optical glass.

7. The optical element according to claim 6, wherein the optical element is any one of a lens, a prism or a mirror.

8. An optical instrument comprising:
an optical element, wherein
the optical element is the optical element according to claim 6.

9. The optical instrument according to claim 8, wherein the optical instrument is a camera, and the optical element is a lens.

10. A method for manufacturing an optical glass using a containerless solidification method, the method comprising:
levitating a glass material with a levitation gas, wherein the glass material comprises:
  $La^{3+}$, $Zn^{2+}$, and $Nb^{5+}$, and optionally $Ti^{4+}$, $Gd^{3+}$, $Y^{3+}$, $Yb^{3+}$, and/or $Lu^{3+}$, wherein expressed as cation %, $La^{3+}$, $Zn^{2+}$, $Nb^{5+}$, and $Ti^{4+}$ satisfy:
    10 cat %≤$La^{3+}$≤20 cat %;
    20 cat %<$Zn^{2+}$≤60 cat %;
    20 cat %≤$Nb^{5+}$≤60 cat %; and
    0 cat %≤$Ti^{4+}$≤40 cat %,
  wherein $B_2O_3$ is not contained in the glass;
heating and melting the levitated glass material to obtain a melt; and
cooling and solidifying the melt in a state where the melt is levitated.

11. The method for manufacturing an optical glass according to claim 10, wherein the optical glass material satisfies:
  10 cat %≤$La^{3+}$≤20 cat %;
  20 cat %<$Zn^{2+}$≤60 cat %;
  30 cat %≤$Nb^{5+}$≤60 cat %; and
  $Ti^{4+}$=0 cat %.

12. The method for manufacturing an optical glass according to claim 10, wherein
the optical glass material satisfies
  60 cat %≤(Total amount of $La^{3+}$, $Gd^{3+}$, $Y^{3+}$, $Yb^{3+}$, $Lu^{3+}$, $Zn^{2+}$, and $Nb^{5+}$)≤100 cat %.

* * * * *